3,025,286
PRODUCTION OF TRANS-POLYBUTADIENE BY STEREO-SPECIFIC ACTION OF RHODIUM CHLORIDE ON BUTADIENE-1,3 IN AQUEOUS EMULSION
Homer P. Smith, Little Falls, N.J., and Geoffrey Wilkinson, London, England, assignors to United States Rubber Company, New York, N.Y., a corporation of New Jersey
No Drawing. Filed June 12, 1959, Ser. No. 819,833
10 Claims. (Cl. 260—94.3)

This invention relates to a method of polymerizing butadiene-1,3, and more particularly it relates to the polymerization of butadiene-1,3 in aqueous emulsion in the presence of rhodium chloride, whereby polybutadiene having the trans structure is produced, substantially free from the cis and vinyl structures.

It has previously been known to carry out stereo-specific polymerizations of monomers such as butadiene-1,3, in solution or in bulk in the presence of heterogeneous, ionic catalysts. Examples of such stereo-specific polymerization are described in Belgian Patent 545,952, issued to Natta et al., on March 10, 1956. However, the catalysts used for such stereo-specific polymerizations are in general not effective in emulsion polymerizations, and therefore it has not heretofore been known, insofar as the present inventors are advised, to carry out stereo-specific polymerization in aqueous emulsion.

Accordingly, a principal object of the present invention is to provide a method of carrying out stereo-specific polymerization in aqueous emulsion.

The invention is based on the surprising and unexpected discovery that if butadiene-1,3 is polymerized in aqueous emulsion, in the presence of rhodium chloride, the polybutadiene formed is almost exclusively of the trans structure to the virtual exclusion of substantial quantities of the cis and vinyl structures. It has surprisingly been found that rhodium chloride has a highly specific spatial directing effect on the polymerization of butadiene-1,3 in aqueous emulsion. This is a unique effect in the field of emulsion polymerization insofar as the present inventors are aware. This effect is in contrast to the conventional emulsion polymerization of butadiene-1,3, which yields varying proportions of cis, trans and vinyl structure in the polymer, depending mainly upon the temperature of polymerization as shown by Whitby in his book "Synthetic Rubber" (John Wiley & Sons, Inc., New York), pp. 342–344.

As is well understood by those skilled in this art, trans polybutadiene is believed to have the following structure, formed by addition of butadiene molecules to each other at the 1 and 4 positions:

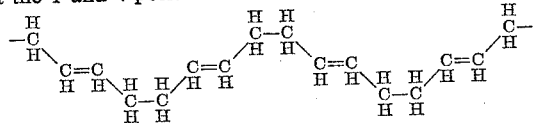

On the other hand the cis structure, also formed by 1,4-addition, is believed to be as follows:

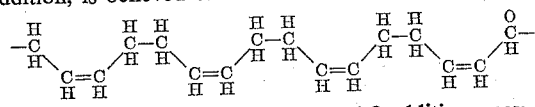

The side vinyl structure, formed by 1,2-addition, may be represented as follows:

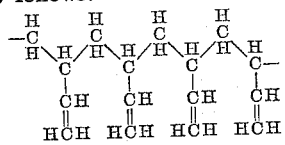

In accordance with the present invention, a conventional emulsion polymerization recipe containing butadiene-1,3 is prepared, optionally using any of the usual suitable emulsion polymerization catalysts or initiators, emulsifying agents, regulators, and other desired emulsion polymerizing ingredients, and a small amount of rhodium chloride, and the emulsion is simply subjected to conventional polymerization conditions. Recovery of the resulting polymer (after "short-stopping" the mixture, if desired) may be effected by conventional methods, and infra-red spectrum examination reveals that the polymer contains an extremely high proportion (typically at least 85%, and frequently over 90%, and even as high as 95% or more) of the trans structure, the remainder usually being mostly of the cis structure and to a lesser extent of the vinyl structure. This is in contrast to conventional emulsion polymerization practice, which seldom yields appreciably more than about 80% or so of the trans structure, the remainder being mainly the vinyl structure with a lesser amount of cis structure.

It is desired to emphasize that such details as the aqueous polymerization recipe, polymerization procedure, and method of recovery of the polymer are optional and may be purely conventional, the essential point of novelty in the process residing in the employment of rhodium chloride as described. Thus, any conventional emulsion polymerization catalyst system or initiating system may be employed, such as those based on such organic or inorganic peroxy compounds as benzoyl peroxide, hydrogen peroxide, and salts of the per-acids such as potassium persulfate; azo compounds, such as azobisisobutyronitrile, decomposing to give free radicals; redox systems such as: polyamines, e.g., triethylenetetramine, in combination which organic peroxides (e.g., diisopropylbenzene hydroperoxide); sulfoxylatesequestered ferrous ion-organic hydroperoxide; sugar-ferrous ion-pyrophosphate-hydroperoxide. Other suitable catalysts include those mentioned in U.S. Patent 2,780,605, Bevilacqua, Feb. 5, 1957, as well as the hydroperoxides mentioned in U.S. Patent 2,725,415, Bevilacqua, Nov. 29, 1955, and the free radical type polymerization initiators mentioned in U.S. Patent 2,716,644, Simpson, Aug. 30, 1955, and also the catalysts and activators mentioned in 2,628,956, Brown, Feb. 17, 1953. The amount of such catalyst employed is purely conventional and is not critical, and it may be mentioned that from about 0.1 part to 5 parts, per 100 parts of butadiene-1,3, is frequently suitable.

Suitable conventional emulsifying agents that may be mentioned by way of non-limiting examples include anionic surface-active agents such as alkyl sulfonates (e.g. dodecyl sodium sulfonate, cetyl potassium sulfonate), alkyl sulfates (e.g. sodium oleyl sulfate), sulfonated ethers of long chain and short chain aliphatic groups (e.g. $C_{17}H_{33}$—O—$C_2H_4$—$SO_3$—Na), sulfated ethers of long and short chain aliphatic groups (e.g. $C_{17}H_{33}$—O—$C_2H_4$—O—$SO_3Na$), sulfonated alkyl esters of long chain fatty acids, e.g.

$$C_{17}H_{33}-\overset{O}{\underset{\|}{C}}-O-C_2H_4-SO_3Na$$

sulfonated glycol esters of long chain fatty acids, e.g.

$$C_{17}H_{33}-\overset{O}{\underset{\|}{C}}-O-C_2H_4-O-SO_3Na$$

sulfonated alkyl substituted amides of long chain fatty acids, e.g.

$$C_{17}H_{33}-\overset{O}{\underset{\|}{C}}-NH-C_2H_4-SO_2Na$$

$$C_{17}H_{33}-\overset{O}{\underset{\|}{C}}-\overset{CH_3}{\underset{|}{N}}-C_2H_4-SO_3Na$$

alkylated aryl sulfonates (e.g. isopropyl naphthalene sodium sulfonate, dodecyl benzene sodium sulfonate), hydroaromatic sulfonates (e.g. tetrahydronaphthalene sodium sulfonate), alkyl sulfosuccinates (e.g. dioctyl sodium sulfosuccinate), and aryl sulfonate-formaldehyde condensation products, e.g. condensation product of formaldehyde and sodium naphthalene sulfonate

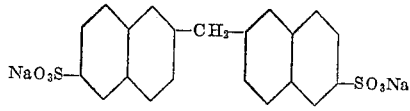

Examples of suitable cationic and non-ionic, surface-active agents are mentioned in U.S. Patent 2,809,174, Dereniuk, Oct. 8, 1957, col. 4, 1.54 to col. 5, 1.26. Such acid-stable surface active agents provide an effective emulsion in the presence of rhodium chloride, which is acidic in aqueous solution. The amount of surface-active emulsifying agent employed is conventional and non-critical, and usually ranges from about 1 to 10 parts per 100 parts by weight of butadiene-1,3.

The usual regulators or chain transfer agents, e.g., alkyl mercaptans, usually those in which the alkyl group contains from 8 to 20 carbon atoms, conventionally employed in emulsion polymerization of butadiene and similar monomers may be employed in the present invention also if desired. Such regulators are frequently conventionally used in amounts of from about 0.2 to 2 parts per 100 parts by weight of the monomer.

Although it is not desired to limit the invention to any particular theory of operation, it appears to be possible that the peculiar action of rhodium chloride on the emulsion polymerization of butadiene-1,3 is related to the ability of the rhodium chloride to form a complex with the butadiene-1,3. Optionally, we may allow the butadiene-1,3 to stand in contact with the rhodium chloride for a period of 2–24 hours to give such complex an opportunity to form, before commencing the polymerization, but this is not essential in all cases.

The rhodium chloride is remarkably effective in exerting stereo-specific influence, so much so that amounts as little as only 0.1 or 0.2 part (calculated as anhydrous $RhCl_3$) per 100 parts of butadiene-1,3 can produce a marked increase in trans structure in the product. We usually prefer to use somewhat larger amounts than this, say 0.2 to 15 parts. If the emulsion polymerization recipe includes a mercaptan regulator we ordinarily prefer to use at least about 0.3 part of rhodium chloride, usually 0.4 to 1 part or more, since there may be some tendency for the rhodium chloride to react with the mercaptan. There is ordinarily no need to use more than about 10–15 parts of rhodium chloride since such amounts are more than enough to produce effective control of the structure, but on the other hand there is no specific disadvantage in using large amounts (e.g. 20 parts), although for reasons of economy we ordinarily do not do so.

It should be noted that although it has previously been known to reduce the proportion of cis structure in polybutadiene by lowering the emulsion polymerization temperature to temperatures such as −20° or −40° C., the product still usually contained 16–18% of the side vinyl structure. Typical data are as follows:

| Polymerization Temp., °C. | Polybutadiene Structure Obtained by Conventional Recipes | | |
|---|---|---|---|
| | Percent cis | Percent vinyl | Percent trans |
| −20 | 4 | 15 | 81 |
| +5 | 8 | 15.5 | 76.5 |
| +50 | 15 | 18 | 67 |
| +80 | 18 | 18 | 64 |

In contrast, typical structural data on products made by the method of the invention are as follows:

| Polymerization Temp., °C. | Polybutadiene Structure Obtained by Rhodium Chloride Recipes | | |
|---|---|---|---|
| | Percent cis | Percent vinyl | Percent trans |
| +5 | 3 | <1 | 97 |
| +50 | 6 | 1 | 93 |

It will be noted in the table above that the use of rhodium chloride gives a polybutadiene with a higher proportion of trans structure than can be obtained by a conventional emulsion recipe carried out at as low a temperature as practicable. The rhodium chloride recipe substantially completely eliminates the side vinyl structure, which is nearly constant and independent of temperature with the conventional recipe. The proportion of cis structure with the rhodium chloride recipe is as low as is obtained at sub-zero temperatures with the conventional recipe.

The present process may be carried out at any temperature conventionally used for emulsion polymerization of butadiene-1,3, ranging all the way from low temperature polymerization ("cold," e.g. −20° or −40° C., with suitable modifications of the emulsion polymerization recipe that will be obvious to those skilled in the art) to high temperature polymerization ("hot," e.g., 60° or even 80° C. or more).

Trans polybutadiene is a resinous material, as distinguished from the rubbery polybutadiene produced by conventional emulsion polymerization methods. The material may be molded under elevated temperatures and pressures to make tough, useful objects of all sorts such as helmets, trays, etc. It may be used as a substitute for balata. It may be compounded for vulcanization in the same manner as ordinary rubber, and vulcanized or cured to make useful articles. It may be mixed with natural or synthetic rubber (e.g. SBR) as a compatible stiffener. In the form of sheets, it may be vacuum formed or otherwise shaped into useful forms. It is suitable as a resinous component of heat hardenable or baked surface finishes.

The practice of the invention may follow the usual emulsion polymerization technique. Thus, an autoclave is usually loaded with distilled or deionized water, rhodium chloride (solid or in solution), emulsifier, salts or buffer solution (if desired), and chain transfer agent, and is flushed with nitrogen. A suitable source of free radicals (single chemical or a combination) is added. The autoclave is chilled, loaded with butadiene, and sealed. A suitable initiator may be added to the autoclave if needed. Polymerization is allowed to proceed with agitation at a suitably controlled temperature. The progress of the reaction may be followed by taking solids in the usual way. At any time desired, the reaction may be stopped by hydroquinone or other suitable chemical and the autoclave may be vented. A suitable antioxidant is typically added at this time. The latex is coagulated by pouring into methanol or by other suitable means. The remaining rhodium chloride is washed out with water, the polymer washed (e.g. with methanol) and dried.

The analysis of the products obtained in the working examples below for the proportions of double bonds of the three types (trans, cis, and vinyl) was carried out for those samples soluble in carbon disulfide, as described by R. H. Hampton, Analytical Chemistry 21, 923 (1949). For samples containing appreciable amounts of polymer insoluble in carbon disulfide, a modification of this method was used, in which pellets molded from powdered potassium bromide and finely divided polymer were used as the radiation absorbing medium. The percentage values of the structures were normalized, that is, multiplied by 100 over the total of the percentages of the three types of structure, so that the adjusted percentages totalled one hundred percent. The procedure of running blanks on all experiments was followed.

The following examples, in which all quantities are expressed by weight, will serve to illustrate the practice of the invention in more detail.

EXAMPLE I

*Effect of Rhodium Chloride on Structure at 50° C.*

Two glass autoclaves (soda bottles) were prepared, coded I–A and I–B respectively. In I–A were loaded (in parts by weight) 200 parts of water, .073 part of hydrogen chloride, .5 part of mixed tertiary alkyl mercaptans (60% $C_{12}$, 20% $C_{14}$, 20% $C_{16}$) ("MTM"–4, Phillips Petroleum Co.), 5 parts of sodium lauryl sulfate ("Aquarex ME," Du Pont) and 1 part of azoisobutyronitrile. The bottle was flushed with nitrogen, chilled, loaded with 100 parts of butadiene and sealed. The bottle coded I–B was loaded with 14.3 parts of commercial rhodium trichloride trihydrate (rhodium chloride 40%), supplied by Engelhard Laboratories, followed by identical amounts of the same ingredients that were loaded into I–A. The sealed bottles were rotated over night at room temperature to allow time for a compound to form between rhodium chloride and butadiene (this step is optional). In the morning the oil layer in I–A was 1⅜" thick, while in I–B the oil layer was only 1⅛" thick. A precipitate appeared in I–A that was not noticeable in I–B. The bottles were rotated end-over-end in a polymerization bath at 50° C. for 24 hours. At the end of that time no oil layer remained in either bottle. Reaction was stopped by the addition of 1.6 ml. of 40% aqueous potassium dithiocarbamate ("Thiostop K," Naugatuck Chemical Co.), to each bottle. The bottles were vented and treated with 1 part of antioxidant (dibetanaphthyl paraphenylenediamine, "Agerite White," R. T. Vanderbilt Co.) on the initial butadiene charge. The bottle I–B had flocced out. Both the bottles were treated with methanol for coagulation. The product from I–A was washed with methanol. The product from I–B was soaked in water, then methanol and washed with methanol. Both products were dried in a vacuum oven at 50°. Samples were purified for structure determination. The analyses are given below:

|  | I–A<br>No rhodium<br>chloride | I–B<br>14.3 parts<br>rhodium<br>chloride |
|---|---|---|
| Percent trans | 65.5 | 93 |
| Percent vinyl | 19 | <1 |
| Percent cis | 15.5 | 6 |

It is evident that rhodium chloride increased the proportion of trans in a "hot polybutadiene," reduced the proportion of cis and substantially eliminated the side vinyl structure.

EXAMPLE II

*Effect of Rhodium Chloride at 5° C.*

Two soda bottles were coded II–A and II–B. II–A was loaded with (in parts by weight) 190 parts distilled water, 19.9 parts concentrated hydrochloric acid .5 part "MTM–4" and 4.5 parts "Aquarex ME." The bottle was flushed with nitrogen. A catalyst mix of .2 part sodium formaldehyde sulfoxylate, .042 part trisodium salt of ethylenediamine tetraaceticacid ("Sequestrene $Na_3$," Alrose Chem. Co.) and 0.28 part of $FeSO_4 \cdot 7H_2O$ in 9.7 parts of water was added. The bottle was chilled, 100 parts of butadiene added, and the bottle sealed. The bottle was rotated overnight in a 5° C. bath before initiation (optional). Polymerization was started by the addition of .3 part diisopropylbenzene hydroperoxide at 5° C. Bottle II–B was loaded with 14.3 parts of commercial rhodium trichloride trihydrate and then with 192 parts of water, 1.99 parts concentrated hydrochloric acid, .5 part "MTM–4," and 4.5 parts "Aquarex ME." The subsequent loading and treatment were identical with that of II–A.

After 8 hours II–A was stopped by the addition of .64 part "Thiostop K." It was vented 1 part of "Agerite White" added, and coagulated with methanol. The polymer was washed with methanol and vacuum dried at 50° C. II–B was similarly shortstopped after 168 hours. The polymer was worked up similarly to II–A with the exception that it was more thoroughly washed. After drying both II–A and II–B were purified for structure analysis by infrared. The results are as follows:

|  | II–A<br>No rhodium<br>chloride | II–B<br>14.3 parts<br>rhodium<br>chloride |
|---|---|---|
| Percent trans | 77 | 97 |
| Percent vinyl | 15 | <1 |
| Percent cis | 8 | 3 |
| Percent Crystallinity |  | 55 |

It is evident that the rhodium chloride in II–B increased the proportion of trans in a "cold" polybutadiene from 77% to 97%, eliminated the side vinyl, and reduced the cis from 8 to 3%. A sample of II–B, when tested for crystallinity by X-ray technique, gave a value of 55%, indicating that we have prepared the resin trans polybutadiene by emulsion polymerization.

EXAMPLE III

*Effect of Concentration of Rhodium Chloride on the Structure of Polybutadiene at 50° C.*

Four bottles were coded III–A, III–B, III–C and III–D respectively. In these were placed the following amounts of rhodium chloride trihydrate in parts by weight respectively: 0, 2.63, .526 and .105. From here on the loadings of the bottles were identically as follows: 200 parts distilled water, .073 part hydrogen chloride, .30 part tertiary octyl mercaptan, 5 parts Aquarex ME, 1 part azoisobutyronitrile, and a flushing with nitrogen. After chilling the bottles, 100 parts of butadiene were loaded and the bottles sealed. They rotated an hour cold before starting polymerization. They were then transferred to a polymerization bath controlled at 50° C. and rotated end over end to such times as were necessary to achieve polymerization. The bottles were shortstopped with hydroquinone, vented, treated with 1 part of di-betanaphthyl-paraphenylenediamine on the original charge. The products were coagulated with methanol. III–B, III–C, III–D were washed with water. All four samples were washed with methanol and vacuum dried at room temperature. Samples of each polymer were purified for structure determination by infrared spectroscopy as described previously. The analyses were made as KBr pellets. The analytical data are given below:

| Code | III–A | III–B | III–C | III–D |
|---|---|---|---|---|
| Parts $RhCl_3 \cdot 3H_2O$ per 100 butadiene | 0 | 2.63 | .526 | .105 |
| Percent trans | 66 | 96 | 93 | 70 |
| Percent vinyl | 17 | 1 | 2 | 14 |
| Percent cis | 17 | 3 | 5 | 16 |

Having thus described our invention, what we claim and desire to protect by Letters Patent is:

1. In a method of polymerizing butadiene-1,3 in aqueous emulsion polymerization, the improvement which comprises the step of carrying out the said aqueous emulsion polymerization of butadiene-1,3 in the presence of rhodium chloride in sufficient quantity to increase the trans-1,4 content of the product.

2. A method of rendering the emulsion polymerization of butadiene-1,3 stereo-specific comprising polymerizing butadiene-1,3 is an aqueous emulsion in the presence of at least 0.1 part by weight, per 100 parts by weight of butadiene-1,3, of rhodium chloride, whereby formation of polybutadiene having trans structure is effected.

3. A method which comprises agitating, at a temperature of from −40° C. to 80° C., an aqueous emulsion of butadiene-1,3, in the presence of a free-radical polymerization catalyst and at least 0.1 part by weight, per 100 parts by weight of butadiene-1,3, of rhodium chloride, whereby polybutadiene having the trans structure is formed.

4. A method which comprises agitating a mixture of water, an acid-stable emulsifying agent, a free-radical polymerization catalyst, rhodium chloride, and butadiene-1,3, at a temperature of from −40° C. to 80° C., the said rhodium chloride being present in amount of at least 0.1 part by weight, per 100 parts by weight of butadiene-1,3, whereby polybutadiene having the trans structure is produced.

5. A method which comprises forming an aqueous emulsion by agitating butadiene-1,3 in water in the presence of an acid-stable emulsifying agent, the said emulsion containing a free-radical polymerization catalyst and from 0.1 to 20 parts by weight of rhodium chloride, per 100 parts by weight of butadiene-1,3, and maintaining the temperature of said emulsion between −40° C. and 80° C., whereby polybutadiene having the trans structure is produced.

6. A method which comprises contacting rhodium chloride with butadiene-1,3 for a period of from 2 to 24 hours, and thereafter subjecting the mixture to polymerizing conditions in aqueous emulsion containing an acid-stable emulsifying agent and a free radical polymerization catalyst, whereby polybutadiene having the trans structure is formed, the said rhodium chloride being present in sufficient quantity to increase the trans-1,4 content of the product.

7. A method which comprises forming an aqueous emulsion of butadiene-1,3 in water, said emulsion containing an acid-stable emulsifying agent, a free radical polymerization catalyst, an alkyl mercaptan in which the alkyl group contains from 8 to 20 carbon atoms as a polymerization regulator, and at least 0.1 part by weight, per 100 parts by weight of butadiene-1,3, of rhodium chloride as a stereo-specific structural directing agent, and agitating said emulsion at a temperature of from −40° to 80° C. to form trans polybutadiene.

8. A method which comprises contacting from 0.2 to 20 parts by weight of rhodium chloride with 100 parts by weight of butadiene-1,3 for a period of from 2 to 24 hours, and thereafter subjecting the mixture to polymerizing conditions in aqueous emulsion containing an acid-stable emulsifying agent and a free radical polymerization catalyst, whereby polybutadiene having the trans structure is formed.

9. A method which comprises contacting from 0.3 to 15 parts by weight of rhodium chloride with 100 parts by weight of butadiene-1,3 for a period of from 2 to 24 hours, and thereafter subjecting the mixture to polymerizing conditions in aqueous emulsion containing an acid-stable emulsifying agent and a free radical polymerization catalyst, whereby polybutadiene having the trans structure is formed.

10. A method which comprises forming an aqueous emulsion of 100 parts by weight of butadiene-1,3 in water, said emulsion containing an acid-stable emulsifying agent, a free radical polymerization catalyst, an alkyl mercaptan in which the alkyl group contains from 8 to 20 carbon atoms as a polymerization regulator, and from 0.3 to 15 parts by weight of rhodium chloride as a stereo-specific structural directing agent, the said rhodium chloride and butadiene-1,3 being contacted with each other for a period of from 2 to 24 hours prior to the polymerization of the butadiene-1,3, and agitating said emulsion at a temperature of from −40° to 80° C. to form trans polybutadiene.

References Cited in the file of this patent

Whitby: "Synthetic Rubber," chapters 8 and 9, Wiley and Sons (New York, 1954).